(12) United States Patent
Sierra Murillo

(10) Patent No.: US 10,690,282 B1
(45) Date of Patent: Jun. 23, 2020

(54) SUPPORT STAND FOR HANDS FREE USE OF ELECTRONIC DEVICES WHILE USING AN EXERCISE MACHINE

(71) Applicant: Carlos Alberto Sierra Murillo, Bogota (CO)

(72) Inventor: Carlos Alberto Sierra Murillo, Bogota (CO)

( * ) Notice: Subject to any disclaimer, the term of this patent is extended or adjusted under 35 U.S.C. 154(b) by 0 days.

(21) Appl. No.: 16/378,972

(22) Filed: Apr. 9, 2019

(51) Int. Cl.
| | |
|---|---|
| *F16M 11/06* | (2006.01) |
| *F16M 11/26* | (2006.01) |
| *F16M 13/00* | (2006.01) |
| *A47G 23/00* | (2006.01) |
| *A47B 23/00* | (2006.01) |
| *F16M 11/08* | (2006.01) |
| *H04M 1/04* | (2006.01) |
| *F16M 11/28* | (2006.01) |
| *F16M 13/02* | (2006.01) |
| *A63B 71/06* | (2006.01) |
| *F16M 11/04* | (2006.01) |

(Continued)

(52) U.S. Cl.
CPC ............ *F16M 11/08* (2013.01); *F16M 11/28* (2013.01); *F16M 13/022* (2013.01); *H04M 1/04* (2013.01); *A63B 71/0622* (2013.01); *F16M 11/04* (2013.01); *F16M 11/10* (2013.01); *F16M 11/24* (2013.01); *F16M 2200/06* (2013.01); *F16M 2200/08* (2013.01); *Y10S 248/917* (2013.01); *Y10S 248/919* (2013.01)

(58) Field of Classification Search
CPC ........ F16M 11/06; F16M 11/04; F16M 11/08; F16M 11/10; F16M 11/021; F16M 11/24; F16M 11/28; F16M 13/022; F16M 2200/06; F16M 2200/08; H04M 1/04; Y10S 248/917; Y10S 248/919; A63B 71/0622
USPC .......... 248/121, 125.7, 229.1, 229.15, 229.2, 248/229.25, 284.1, 291.1, 917, 919
See application file for complete search history.

(56) References Cited

U.S. PATENT DOCUMENTS

| | | | | |
|---|---|---|---|---|
| 3,408,032 | A | * | 10/1968 | Francis ................ A47B 23/007 248/450 |
| 4,548,391 | A | * | 10/1985 | Loban .................... A47B 97/00 269/47 |

(Continued)

*Primary Examiner* — Tan Le
(74) *Attorney, Agent, or Firm* — Defillo & Associates, Inc.; Evelyn A Defillo

(57) ABSTRACT

A support stand for an electronic device having a base having a first end and a second end, the first end including a bifurcation forming a first leg and a second leg; a first clamp pivotably attached to the first leg; a second clamp pivotably attached to the second leg; a first post having a first end pivotably connected to the second end of the base; a second post having a first end telescopically connected to a second end of the first post; a platform pivotably connected to a second end of the second post; a horizontally adjustable first arm pivotably attached to the first pole, the horizontally adjustable first arm having a first telescopic section extending away from the first pole; a horizontally adjustable second arm pivotably attached to the first pole, the horizontally adjustable second arm having a second telescopic section extending away from the first pole; a first adjustable fastening device located at a distal end of the first telescopic section; and a second adjustable fastening device located at a distal end of the second telescopic section.

9 Claims, 8 Drawing Sheets

(51) Int. Cl.
*F16M 11/10* (2006.01)
*F16M 11/24* (2006.01)

(56) References Cited

U.S. PATENT DOCUMENTS

| | | | | |
|---|---|---|---|---|
| 5,141,211 A | * | 8/1992 | Adams, Jr. | B25H 3/06 |
| | | | | 269/16 |
| 5,709,365 A | * | 1/1998 | Howard | A47B 23/025 |
| | | | | 248/447.2 |
| 5,771,613 A | * | 6/1998 | Geils | D05C 1/02 |
| | | | | 108/150 |
| 6,045,179 A | * | 4/2000 | Harrison | A47C 7/70 |
| | | | | 248/447.1 |
| 7,865,983 B2 | * | 1/2011 | Newkirk | A61G 7/05 |
| | | | | 5/503.1 |
| 2012/0160980 A1 | * | 6/2012 | Wang | F16M 11/10 |
| | | | | 248/405 |
| 2014/0191103 A1 | * | 7/2014 | Simon | F16M 13/022 |
| | | | | 248/558 |

* cited by examiner

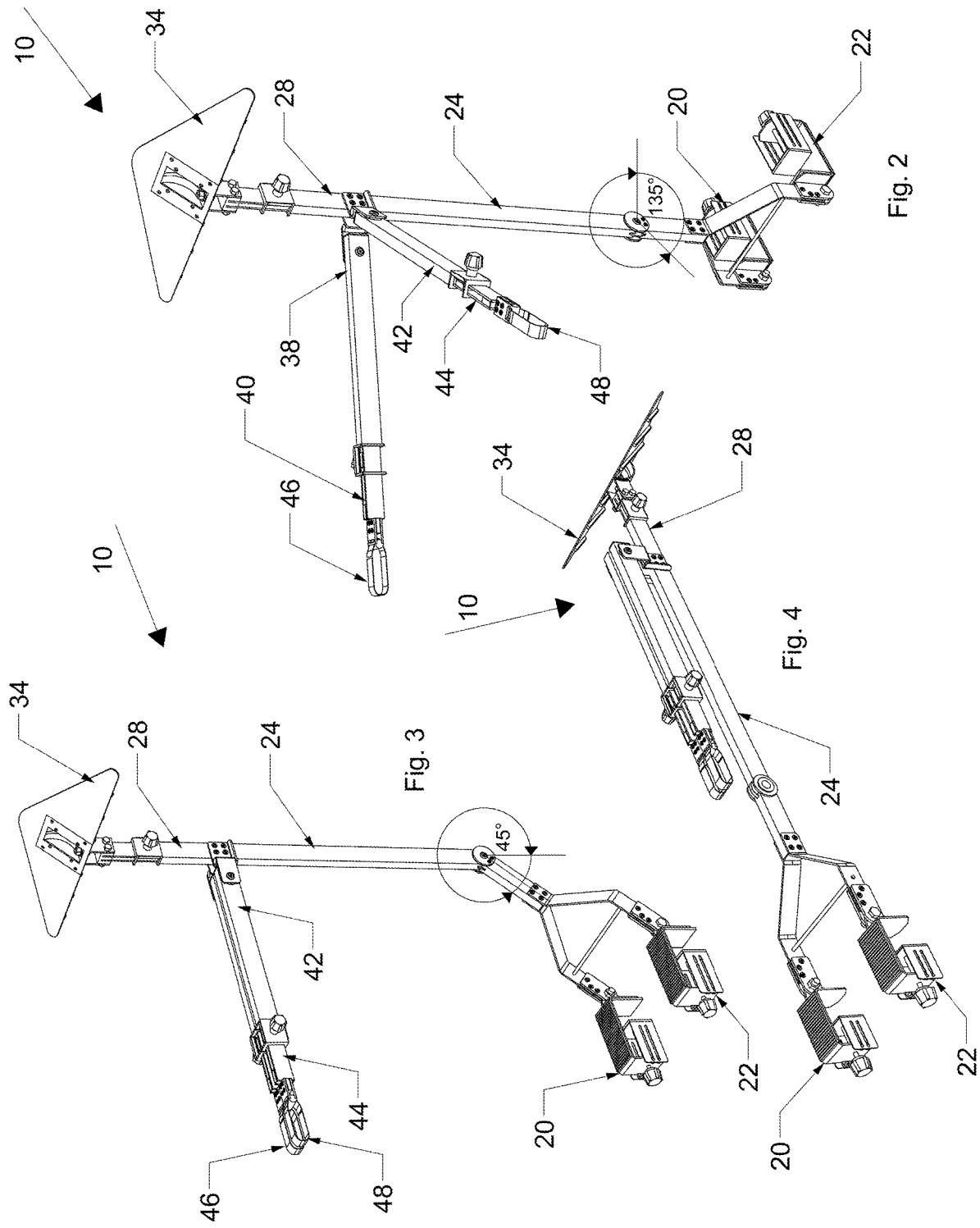

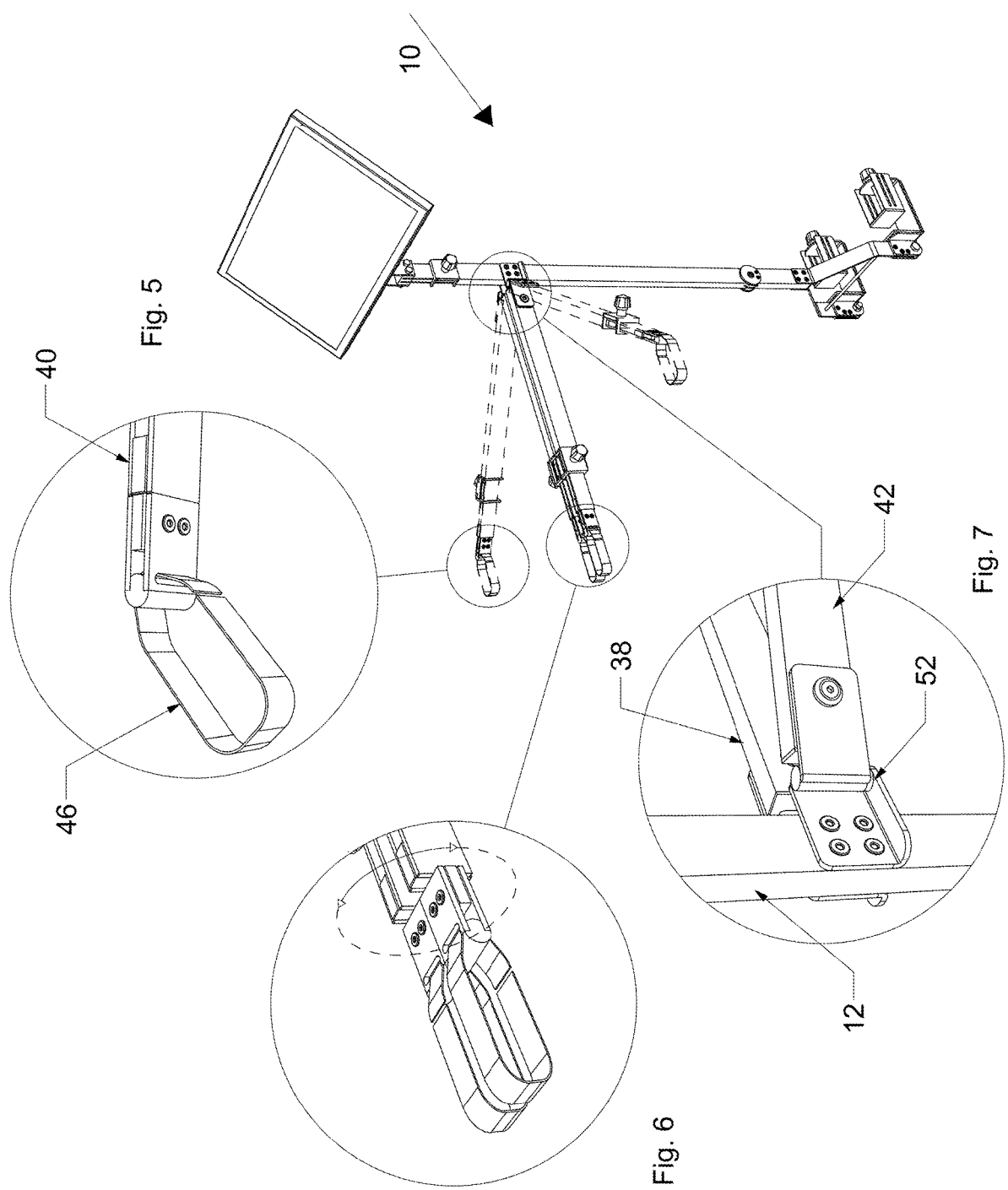

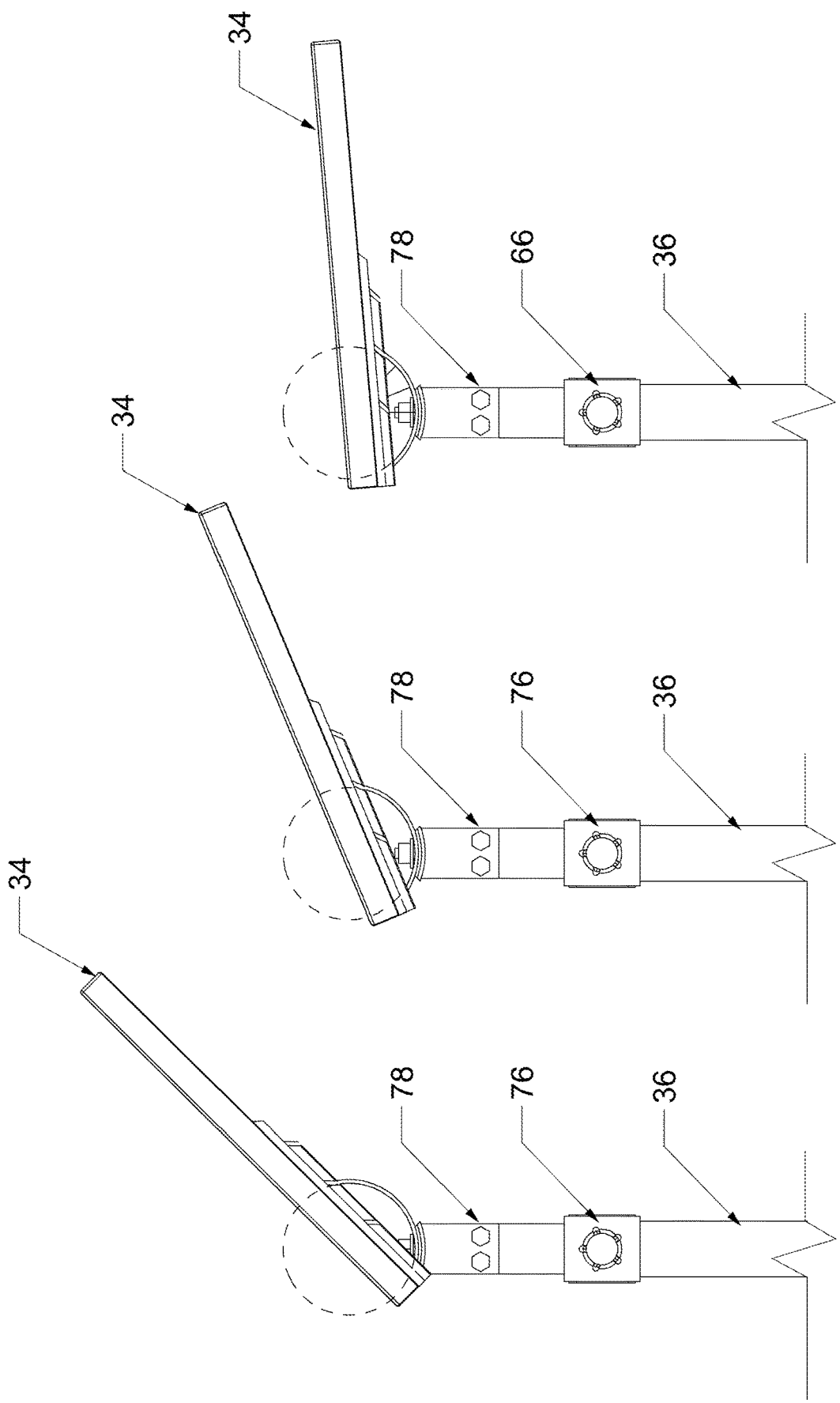

SUPPORT STAND FOR HANDS FREE USE OF ELECTRONIC DEVICES WHILE USING AN EXERCISE MACHINE

FIELD OF THE INVENTION

The present invention relates to a support stand, more specifically to a support stand with leg attachments for hands-free use of electronic devices, while using an exercise machine.

BACKGROUND OF THE INVENTION

Over the years, the use of exercise machines has become a regular part of many people's lives. In addition, people rely on a TV or social media to be up to date in the latest news or friend's status. This causes an increasing trend for people that exercise to have an increasing desire to be connected to a TV and/or an electronic device while exercising.

The prior art shows exercise machines provided with small shelves that can accommodate a phone, a book, or a magazine. Unfortunately, the person usually cannot read or watch clearly the information on the electronic device, since the person is often in a variety of orientations and height with respect to the shelves while using the exercise machine. It is desirable for the person to be able to comfortably watch his/her cell phone or TV or Tablet or Display monitor regardless of his/her orientation.

Usually, the gym includes several TV screens that show different shows. Unfortunately, the TV screens are located far away from the user and set to show general audience shows. In view of this, the user cannot clearly see the show or watch his/her favorite shows or the application they prefer or any other kind of streaming service like YouTube or smart-TV content.

The prior art also shows book-holding and computer-holding devices that are supported on the frame of the exercise machine. Unfortunately, in most of these devices the height cannot be adjusted to fit the user's height; thus, the user has trouble reading the book or looking at the computer.

In addition, the prior art shows some books or computer holders in which the height can be vertically adjusted. Unfortunately, on these devices the articles or electronic devices cannot be horizontally orientated so that the person can adequately view the articles or electronic devices.

Adjustability is an important factor in order for the person to be able to comfortably watch his/her tv, read cell phone, electronic devices, a book, or magazine regardless of his/her orientation. Adjustability should be provided for vertical adjustment, horizontal adjustment, and angular adjustment, depending on the user who is in a wide variety of personal orientations.

SUMMARY OF THE INVENTION

The present invention relates to a support stand for an electronic device with leg attachments for hands-free use while using an exercise machine. The electronic device may be, for example, a tablet, a TV, a computer, a display monitor, or a smartphone. In another embodiment, the support stand may be used to hold a book or magazine.

The present invention relates to a support stand for an electronic device having a base having a first end and a second end, the first end including a bifurcation forming a first leg and a second leg; a first clamp pivotably attached to the first leg; a second clamp pivotably attached to the second leg; a first post having a first end pivotably connected to the second end of the base; a second post having a first end telescopically connected to a second end of the first post; a platform pivotably connected to a second end of the second post; a horizontally adjustable first arm pivotably attached to the first pole, the horizontally adjustable first arm having a first telescopic section extending away from the first pole; a horizontally adjustable second arm pivotably attached to the first pole, the horizontally adjustable second arm having a second telescopic section extending away from the first pole; a first adjustable fastening device located at a distal end of the first telescopic section; and a second adjustable fastening device located at a distal end of the second telescopic section.

BRIEF DESCRIPTION OF THE DRAWINGS

FIG. 2 is a perspective view of the support stand of FIG. 1 showing the arms in a separate position;

FIG. 3 is a perspective view of the support stand of FIG. 1 showing the arms in a joined position;

FIG. 4 is a perspective view of the support stand of FIG. 1 in a folded position;

FIG. 5 is a detailed view of the support stand of FIG. 1 showing the distal end section of a single arm;

FIG. 6 is a detailed view of the support stand of FIG. 1 showing the distal end section of the two second telescopic sections of the horizontally adjustable arms when the arms are joined together;

FIG. 7 is a detailed view of the support stand of FIG. 1 showing the connection of the arms to the first post;

FIG. 14 is a detailed view of the support stand of FIG. 1 showing the platform to hold an electronic device at a first angle with respect to the telescopic pole;

FIG. 15 is a detailed view of the support stand of FIG. 1 showing the platform to hold an electronic device at a second angle with respect to the telescopic pole; and FIG. 16 is a detailed view of the support stand of FIG. 1 showing the platform to hold an electronic device at a third angle with respect to the telescopic pole.

DETAILED DESCRIPTION OF THE INVENTION

Figure 1:
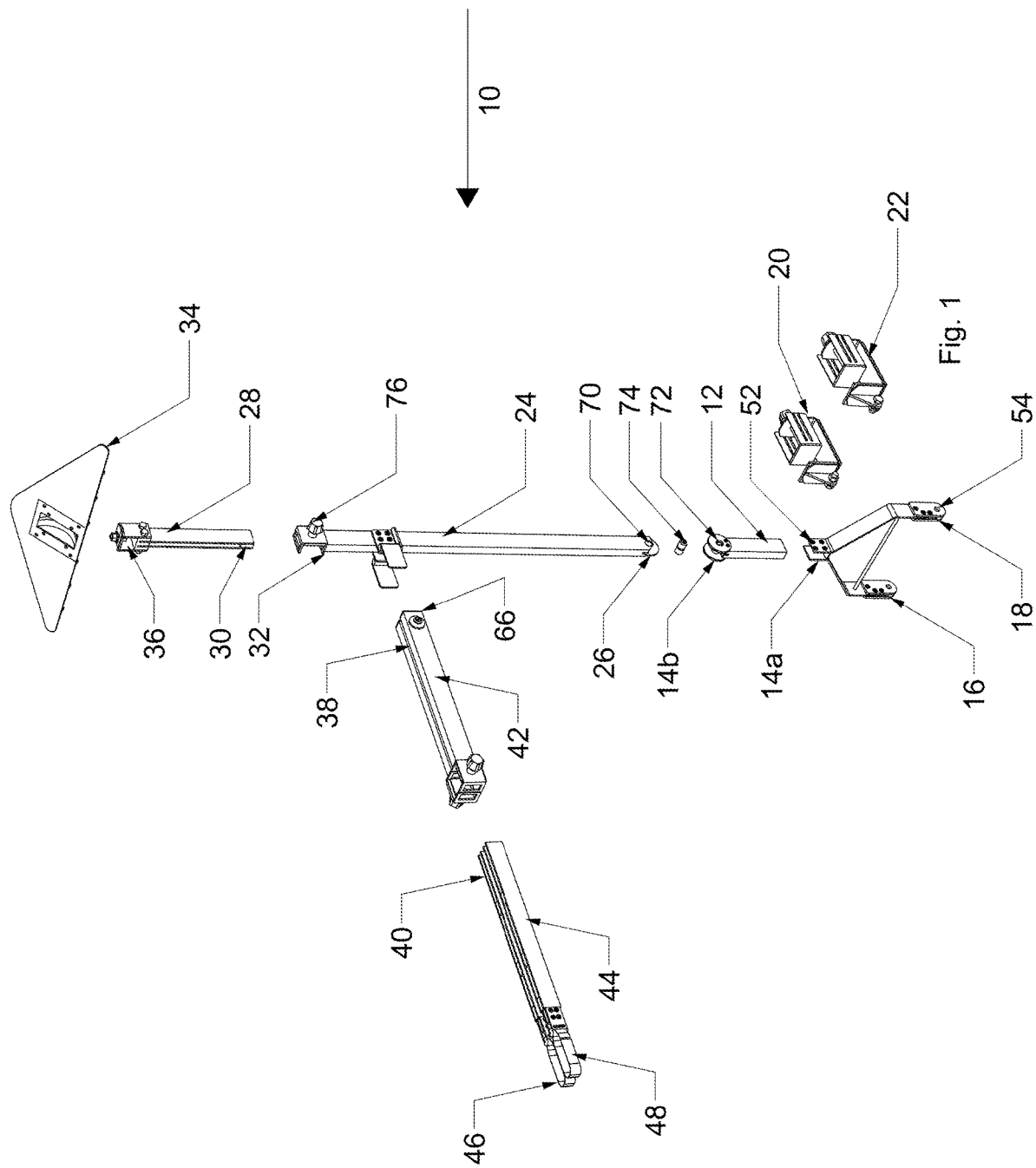
FIG. 1 is an exploded perspective view of the preferred embodiment of the support stand according to the present invention.

FIGS. 1-4 show the support stand 10 according to the present invention. The support stand 10 includes:

a base 12 having a first end 14a and a second end 14b, the first end 14a including a bifurcation forming a first leg 16 and a second leg 18;

a first clamp 20 pivotably attached to the first leg 16; a second clamp 22 pivotably attached to the second leg 18;

a first post 24 having a first end 26 pivotably connected to the second end 14b of the base 12;

a second post 28 having a first end 30 telescopically connected to a second end 32 of the first post 24;

a platform 34 pivotably connected to a second end 36 of the second post 28; a horizontally adjustable first arm 38 pivotably attached to the first pole 24, the horizontally adjustable first arm 38 having a first telescopic section 40 extending away from the first pole 24;

a horizontally adjustable second arm 42 pivotably attached to the first pole 24, the horizontally adjustable second arm 42 having a second telescopic section 44 extending away from the first pole 24;

a first adjustable fastening device 46 located at a distal end of the first telescopic section 40; and a second adjustable fastening device 48 located at a distal end of the second telescopic section 50.

The components of the support stand 10 of the invention can be made from a sturdy material, for example, steel, aluminum, reinforced carbon fiber, or cured plastic. The support stand 10 may have a height between 10 inches to 10 feet, preferably between 20 inches and 7 feet.

The first post 24 has a first end 26 pivotably connected to the second end 14b of the base 12. The first end 26 includes a groove 70 that connects with a pivoting knob 72 on the second end 14b of the base and that is secured with a pin 74.

The second post 28 has a first end 30 telescopically connected to a second end 32 of the first post 24. The second post 28 slides inside the first post 24 to adjust the height of the support stand 10 by an appropriate length to accommodate the electronic device. The electronic device is held on the support stand 10 at the desired height by a locking device 76. The locking device 76 is a conventional screw clamp assembly as shown in the drawings.

The foldable position of the support stand 10 of the present invention shown in FIG. 4 is useful when the device is placed in storage or is transported from one location to another.

FIG. 5 shows the distal end section of a single arm. An adjustable fastening device 46, 48 are located at a distal end of the telescopic sections 40, 44. The adjustable fastening devices 46, 48 are adapted to be secured to the support stand 10 to a vertical or horizontal element (not shown) on a substrate, which can be a vertical or horizontal support as the fasten can rotate 90°.

The substrate may be, for example, an exercise machine such as a treadmill, exercise bike, elliptical, rowing machines, spinning equipment, or static bike. In some embodiments, the substrate may be a sofa, recliner, chair, or bed.

The adjustable fastening devices 46, 48 may be made of a material such as hook and loop (VELCRO®), buckles with size adjusting fastener, cable ties, snaps, clips, or laces.

FIG. 6 shows the distal end section of the two second telescopic sections 40, 44 of the horizontally adjustable arms 38, 42 when the arms are joined together.

FIG. 7 shows the pivotably connection of the horizontally adjustable arms 38, 42 to the first post 24. The horizontally adjustable arms 38, 42 are connected to the first post 24 by a first shaft connection device 52. The first shaft connection device 52 may permit a right to left rotational motion swivel type rotation motion about the first post 24, as well as pivot in an up and down way.

The first shaft connection device 52 may secure to the first post 24 by any conventional means, including, but not limited to, screw securing, friction fit, or camming action.

The horizontally adjustable arms 38, 42 move independently of one another. The arms 38, 42 include fastener 66 to secure the arms 38, 42 in a final preferred location, at any point in time. The fastener may be, for example, nuts and bolts, pins, clamps, or clips.

The horizontal adjustments are made by loosening the fastener 66, adjusting the horizontally adjustable arms 38, 42 with respect to the horizontally adjustable arms 38, 42; and by retightening the fastener 66.

Figure 8:
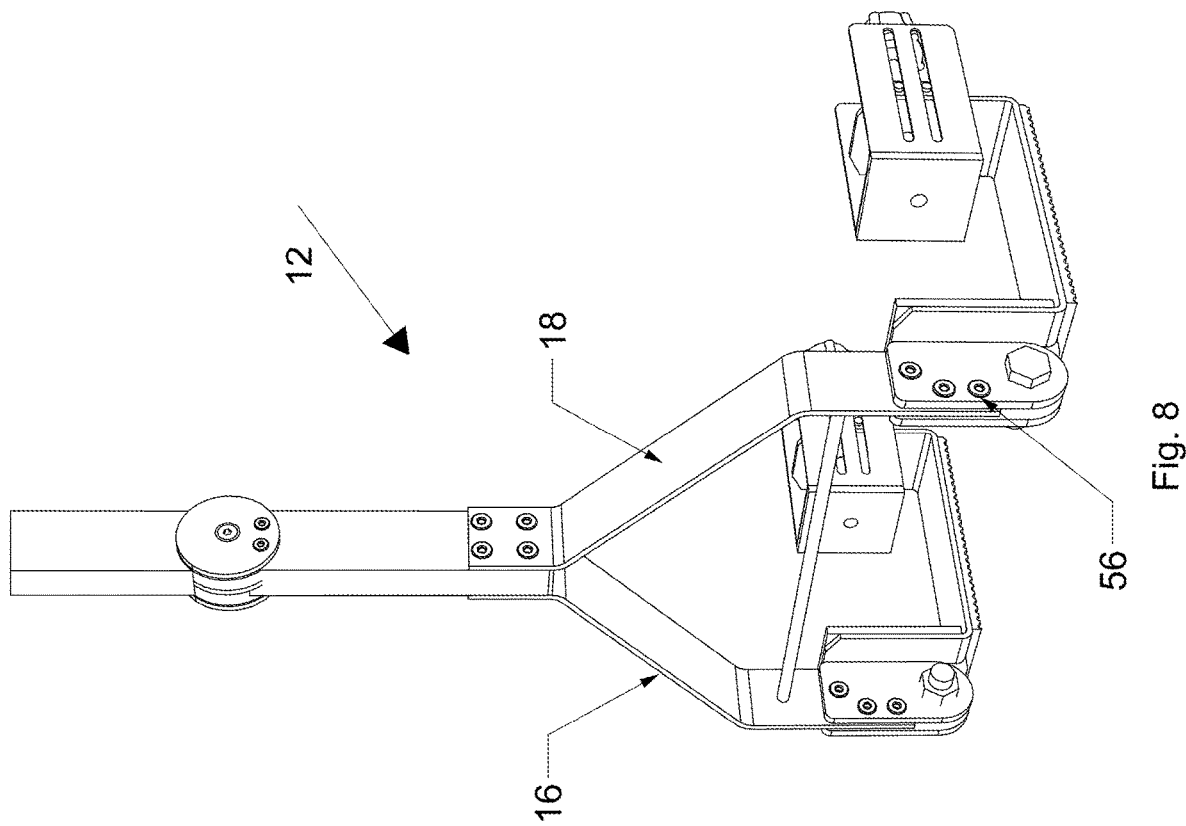
FIG. 8 is a perspective view of the support stand of FIG. 1 showing the legs.
Figure 9:
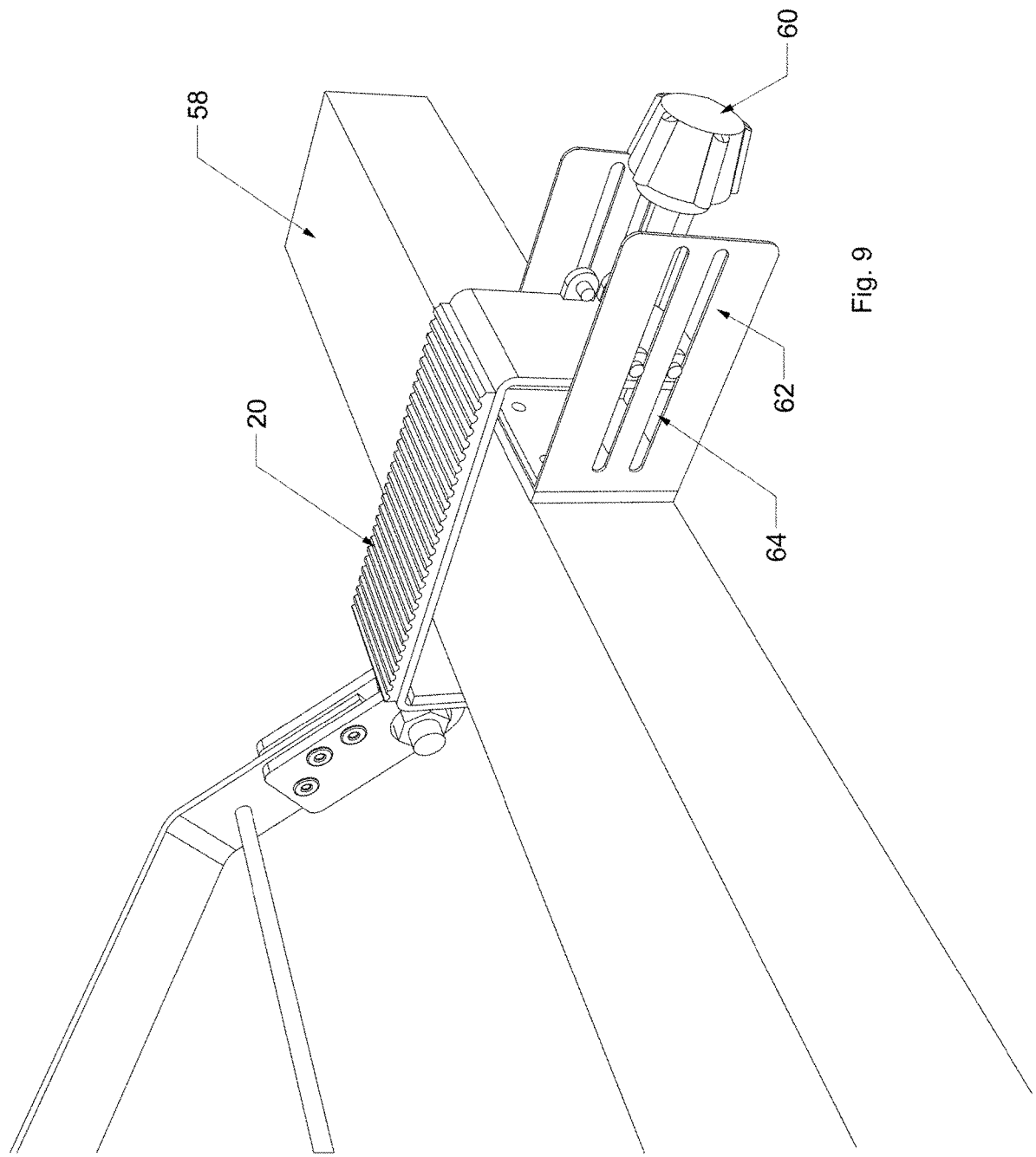
FIG. 9 is a detailed view of the support stand of FIG. 1 showing the clamp on the distal end of a leg when it is secured into an object.
Figure 10:
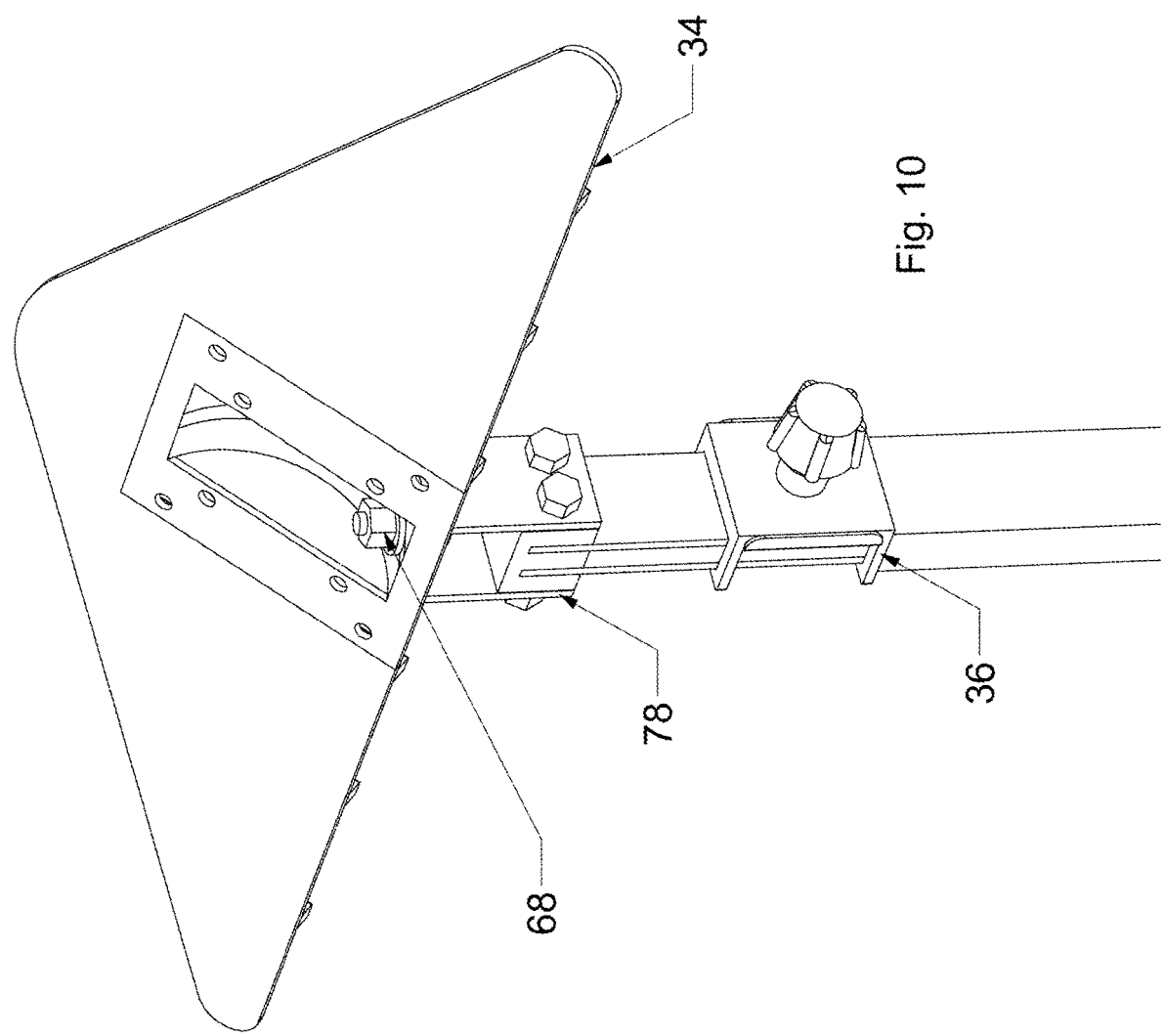
FIG. 10 is a detailed view of the support stand of FIG. 1 showing the platform to hold an electronic device.
Figure 13:
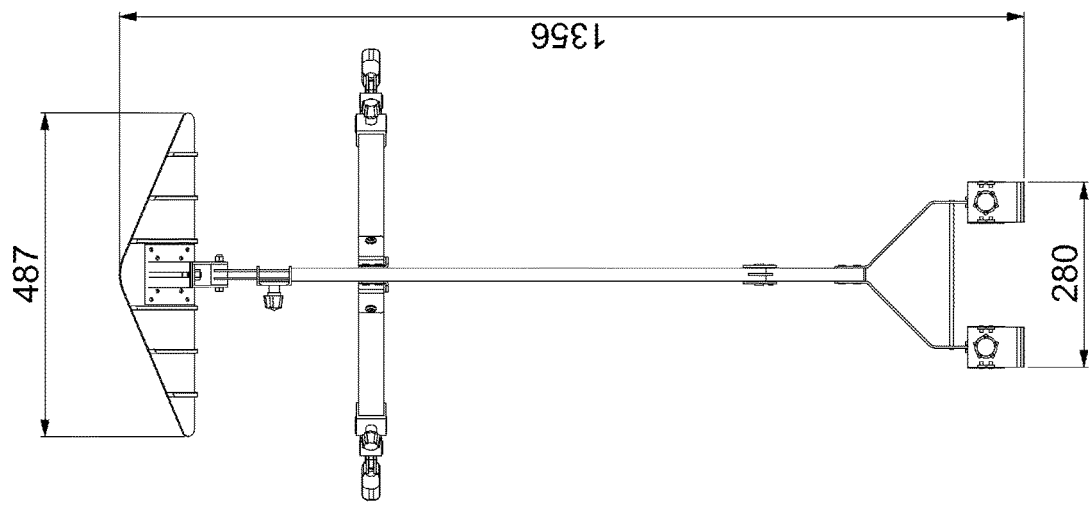
FIG. 13 is a back-side view of the support stand of FIG. 1.

FIGS. 8-9 shows the base 12 according to the present invention. The base 12 may be a pole, rod, or square section tube. The base 12 has the same shape as the first post 24 and the second post 28. Typically, the base 12 may have a length of between 2 to 30 inches. The base 12 includes a first end 14a and a second end 14b. The first end 14a includes a bifurcation with a first leg 16 and a second leg 18.

The first leg 16 and the second leg 18 include holes 54 which matches the holes (not shown) on the clamps 20, 22. The legs 16, 18 are secured to the clamps 20, 22 by passing nuts or screws 56 to the respective holes.

As can be seen by FIG. 9, the clamps 20, 22 are pivotably attached to the legs 16, 18. The clamps 20, 22 have a C-shape and are designed to be clamped to a horizontal element 58 of the substrate, which is ordinarily a horizontal support surface or to rest directly on the floor. The clamps 20, 22 are used for connecting the support stand 10 to the substrate. The clamps 20,22 include in a distal end a threaded hole (not shown) through which a large threaded screw 60 protrudes. A plate 62 having a plurality of slot 64 parallel to the screw, helps the C-clamps 20, 22 to gain leverage when tightening the clamp against the horizontal element 58 of the structure. The clamps 20, 22 can be secured to the horizontal element 58 by rotation of the large threaded screw 60, which moves the distal end of the clamps 20, 22 towards the horizontal element 58.

FIGS. 10 and 14-16 show the platform 34 that holds an electronic device (not shown). Platform 34 is pivotably connected to a second end 36 of the second post 28. The platform 34 may have any geometrical shape, for example, square, rectangular, triangular, or circular.

Platform 34 may tilt between 0 to 90-degree angles with respect to the second post 28. The platform 34 is fastened to the second post 28 by a swivel head 78 which maximizes the ability of the platform 34 to assume any of a variety of positions/angles. In one embodiment, the platform 34 may include a connector 68 to allow a user to electrically connect a TV onto the platform 34.

Figure 11:
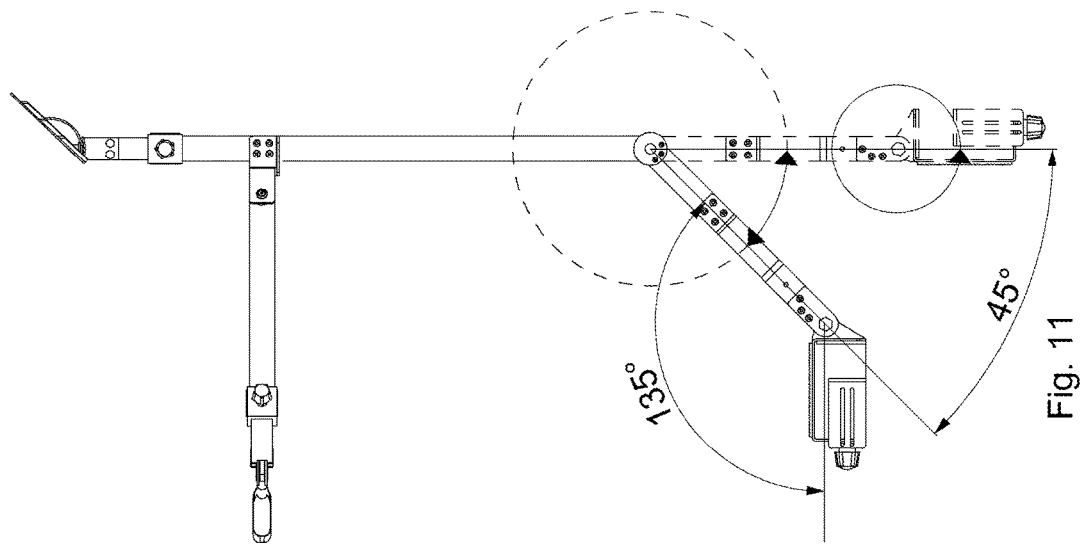
FIG. 11 is a side view of the support stand of FIG. 1 showing a leg pivoting from a first position to a second position.

FIG. 11 shows the support stand having a leg pivoting from a first position to a second position to adjust to the exercise machine or to rest on the floor.

Figure 12:
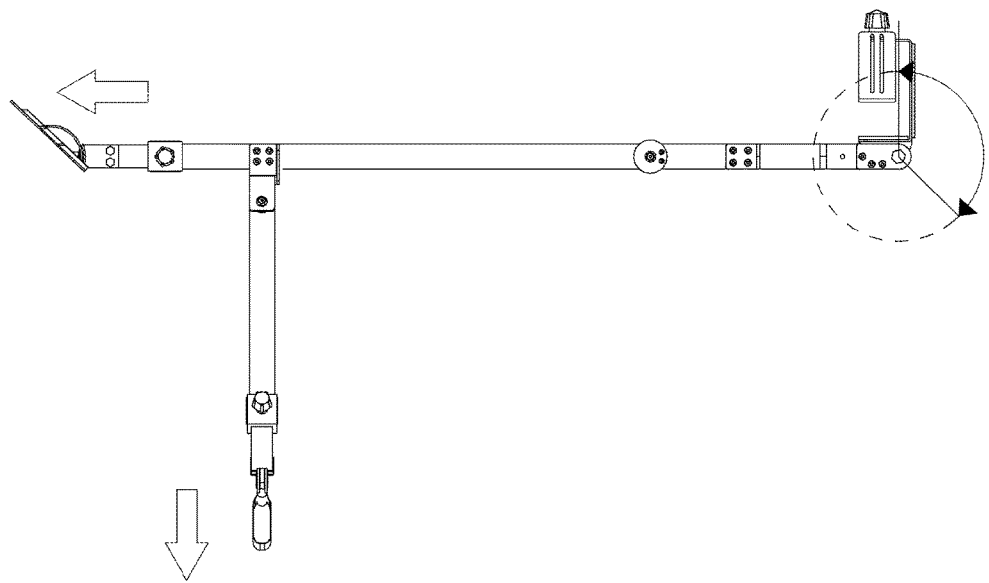
FIG. 12 is a side view of the support stand of FIG. 1 showing a leg in a third position.

FIG. 12 shows the support stand having a leg in a third position to rest directly on the floor.

In an embodiment of the invention, a small dimensions model may be provided that is designed to be used on a bed frame, a table top, or chair.

In an embodiment, the support stand 10 may include speakers (not shown) and/or lights mounted to the first post 24.

The support stand 10 may be placed in front of the substrate (exercise machine, etc.). Then, the adjustable fastening devices 46, 48 are secured to a vertical support element on the substrate. In addition, the clamps 20, 22 are secured to the horizontal support element 58 of the substrate. Then, the person riding the exercise machine selects a comfortable vertical and horizontal position or orientation by: sliding the second post 28 within the first pole 24 to adjust the height; moving horizontally the adjustable arms 38, 42; sliding the telescopic section 40, 44 within the adjustable arms 38, 42 to adjust the distance to the user; and/or tilting the platform 34 to the right angle.

The present invention provides a support stand that permits the user to use an electronic device in a hands-free manner while the person is using an exercise machine.

It should be understood that the above description is intended for illustrative purposes only, and is not intended to limit the scope of the present invention in any way.

The invention claimed is:

1. A support stand for an electronic device comprising:
   a base having a first end and a second end, the first end including a bifurcation forming a first leg and a second leg;
   a first clamp pivotably attached to the first leg;
   a second clamp pivotably attached to the second leg;
   a first post having a first end pivotably connected to the second end of the base;
   a second post having a first end telescopically connected to a second end of the first post;
   a platform pivotably connected to a second end of the second post;
   a horizontally adjustable first arm pivotably attached to the first pole, the horizontally adjustable first arm having a first telescopic section extending away from the first pole;
   a horizontally adjustable second arm pivotably attached to the first pole, the horizontally adjustable second arm having a second telescopic section extending away from the first pole;
   a first adjustable fastening device located at a distal end of the first telescopic section; and
   a second adjustable fastening device located at a distal end of the second telescopic section.

2. The support stand according to claim 1, wherein the horizontally adjustable first arm and the horizontally adjustable second arm move independently of one another.

3. The support stand according to claim 1, wherein the support stand is foldable.

4. The support stand according to claim 1, wherein the adjustable fastening devices are adapted to be secured to a vertical support on the exercise machine.

5. The support stand according to claim 1, wherein the adjustable fastening devices are made of a hook and loop material.

6. The support stand according to claim 1, wherein the horizontally adjustable arms are connected to the first post by using a first shaft connection device that permit a right to left rotational motion about the first post, as well as an up and down pivoting.

7. The support stand according to claim 1, wherein the clamps have a C-shape and are designed clamp into a horizontal support element of the exercise machine.

8. The support stand according to claim 1, wherein each one of the clamps include in a distal end a threaded hole through which a threaded screw protrudes, a plate having a plurality of slots parallel to the screw.

9. The support stand according to claim 1, wherein the platform tilts between 0 to 90 degree angles with respect to the second post 28.

* * * * *